Sept. 4, 1951         W. P. COUSINO         2,567,147
LUBRICATING MECHANISM FOR INJECTION MOLDING APPARATUS
Filed July 16, 1947

INVENTOR.
Walter P. Cousino
BY Harness & Harris
ATTORNEYS.

Patented Sept. 4, 1951

2,567,147

UNITED STATES PATENT OFFICE 2,567,147

LUBRICATING MECHANISM FOR INJECTION MOLDING APPARATUS

Walter P. Cousino, Detroit, Mich., assignor to Chrysler Corporation, Highland Park, Mich., a corporation of Delaware Application July 16, 1947, Serial No. 761,348

10 Claims. (Cl. 18—30)

1

This invention relates to an improved injecting molding apparatus and is an improvement over my applications Serial No. 471,693 filed January 8, 1943, now Patent No. 2,402,805; Serial No. 521,197 filed February 5, 1944, now Patent No. 2,487,426, and Serial No. 556,119 filed September 28, 1944, now Patent No. 2,471,813.

This invention embodies improvements in an apparatus for injecting various material under pressure, whereby the apparatus and the passage of such material through it are lubricated by an improved lubricating mechanism.

One of the main objects of my invention is to provide the injection molding apparatus with a lubricating mechanism which is adapted to introduce lubricant to certain of the moving members of the apparatus under pressure.

Another object of my invention is to provide a lubricant pump and driving mechanism in injecting apparatus of this kind which discharges lubricant in timed relation to the operation of the injecting apparatus.

A further object of my invention is to provide means for variably adjusting the lubricating discharge to selectively predetermine the quantity of lubricant emitted during each cycle of operation of the pump.

An additional object of my invention is to provide injection molding apparatus with a plurality of pumps whereby different lubricant may be delivered to the different parts of the apparatus if desired.

Another object of my invention is to provide the injection apparatus with a plurality of pumps which are individually adjustable for predetermining the amount of lubricant discharged from each individual pump.

Another object of my invention is to provide the lubricating mechanism with a heating element so that all the lubricant housed in the mechanism will be of a sufficient temperature to remain in a readily flowable liquid state.

Other objects and advantages of my invention will become more apparent from the following description taken in connection with the accompanying drawings wherein.

Figures 1, 2:
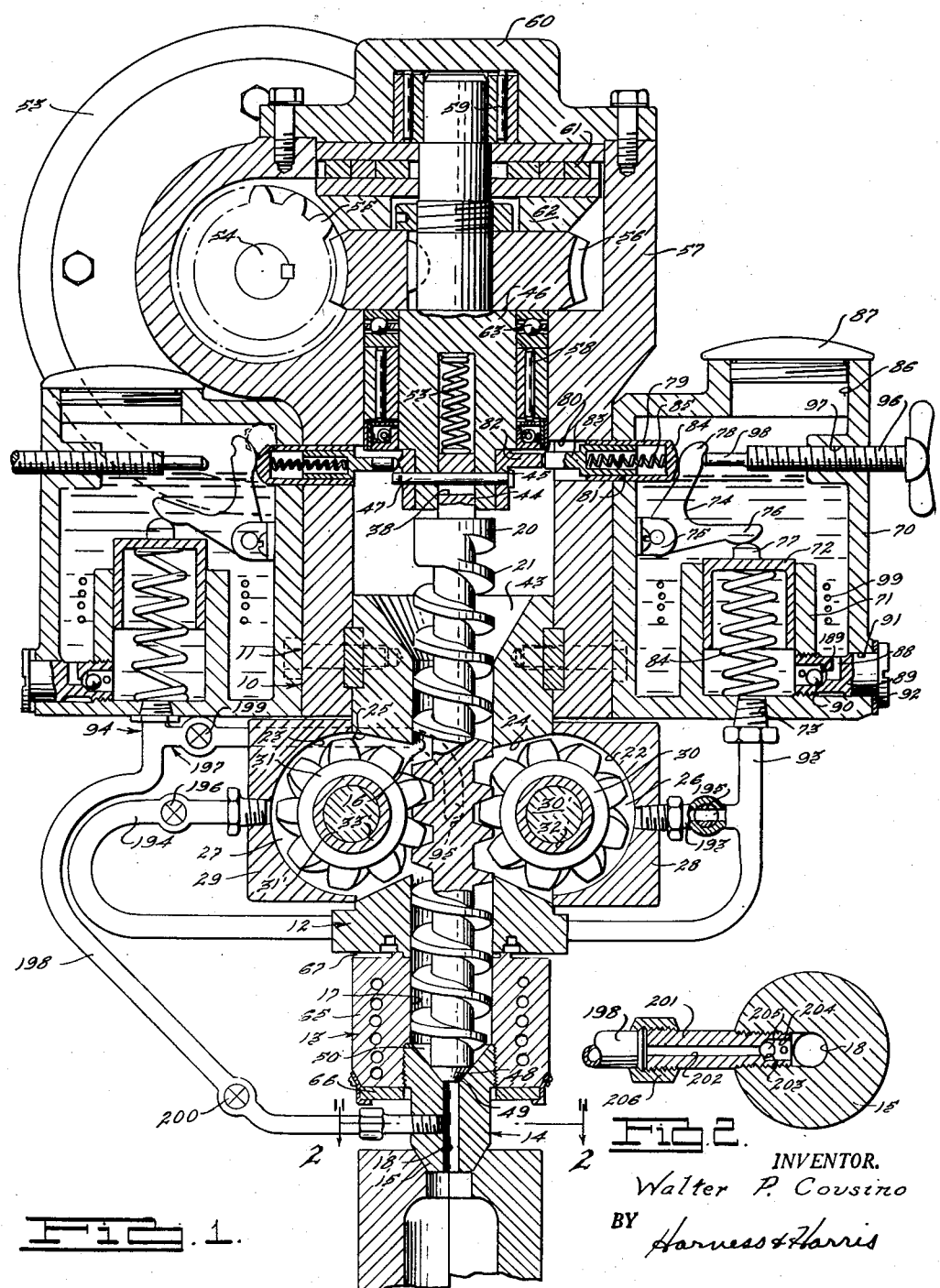
Fig. 1 is a side elevational view, partly in section, of an injection apparatus embodying the invention.
Fig. 2 is an enlarged fragmentary horizontal sectional view taken on line 2—2 of Fig. 1.

While the injecting apparatus is shown in the drawing associated with mold structure it can be readily applied to an extruding die. The injecting apparatus, shown in Fig. 1, comprises a tubular body portion, generally designated by numeral 10, having an upper section 11, an intermediate section 12, and a heating chamber 13 to which is attached a nozzle body 14 having a discharge nozzle element 15 located at its extreme end.

2

The intermediate section 12 is provided with a bore 16 which is axially aligned with a passage 17 in the heating chamber as well as with a discharge passage 18 of the nozzle. A conveyor-like screw 20 extends through the bore 16 and is provided with a thread 21 which relatively closely fits the wall of the bore 16 and which extends through the interior of the upper section 11 to a location adjacent the nozzle body 14. The screw 20 is rotatably and axially shiftably supported by means, hereinafter more fully described, located within the upper section 11 of the tubular body portion 10. Provided on respectively opposite sides of the bore 16 are chambers 22 and 23 which are formed in part by slots 24 and 25, respectively, provided through the wall structure of the intermediate section 12, and in part by recesses 26 and 27 of caps 28 and 29, respectively, which are mounted on the sides of the intermediate section 12 in alignment with slots 24 and 25 thereof.

Rotatably mounted in each chamber 22 and 23 is a gear like element 30 and 31, respectively, having teeth meshed with the thread 21 of the screw 20 in a worm and gear relationship. The gears 30 and 31 have trunnions 30' and 31' journaled in bearings 32' and 33', respectively which are mounted in openings formed in the walls of the recesses. The gears 30 and 31 serve as rotatable dams and the teeth thereof extend to the groove of the thread 21 of the screw 20 to positively oppose turning of material operated upon by the thread of the screw with the latter. In this manner a pressure is positively built up upon material within the bore 16 of the intermediate section 12, as well as upon the material contained in the passage 17 of the heating chamber 13. The teeth of the gears 30 and 31 are meshed with the thread 21 of the screw 20 at a location spaced from the inlet end 43 of the intermediate section 12. There is at least one complete, full turn of the thread of the screw 20 which is in close feeding relationship with respect to the wall of the bore 16 between the inlet end of the bore 16 and the location at which the slots 24 and 25 communicate with the bore. With this construction any material operated upon by the screw which is displaced from the bore 16, by reason of its being carried between the teeth of the gears 30 and 31 is returned to the bore at a location at which material is at least initially compressed by the thread of the screw. Therefore, the moldable material which thus flows through the chambers 22 and 23 is not removed from a zone of high pressure to a zone of atmospheric pressure and accordingly compressive work which has been done on this material is not lost.

The screw 20 has a shank 44 on its upper extremity of substantially square cross section which is shiftably received in a correspondingly shaped socket of a spindle 46. A pin 47 extends through openings in the wall of the socket 45 and a registering oversize slot 38 in the shank 44 for holding the screw against displacement from the spindle and limiting its axial shifting movement in respectively opposite directions. The lower end of the screw 20 is provided with a tapered extremity 48 which is adapted to serve as a valve element and to cooperate with a correspondingly tapered valve seat provided by the wall of the cavity 50 formed in the inner end portion of the nozzle body 14 at a location immediately in advance of the discharge passage 18 of the nozzle. A spring 53 disposed in the socket 45 of the spindle 46 normally yieldably urges the screw 20 downwardly, in order to retain the valve element 48 on its seat 49 and to thus close the inlet end of the nozzle discharge passage 18 while the screw is either at rest or so operating upon material in the passage 16 and 17 as to subject it to compression less than a predetermined value. When the compression to which the material is subjected exceeds this value, the back pressure upon the thread of the screw 20 shifts the latter against the action of the spring, thereby removing the valve element 48 from its seat 49 and accommodating the flow of the material through the discharge passage 18 of the nozzle.

The screw 20 may be driven and controlled by the driving and automatic control apparatus disclosed in my copending application, Serial No. 521,197, but for the purpose of illustration a simplified driving system is illustrated in Fig. 1. This apparatus includes a motor 53 having a shaft 54 provided with a worm 55 which is meshed with a worm gear 56 keyed to the spindle 46. The motor 53 is supported by, and the transmission gearing is disposed within a housing 57 spaced vertically from the intermediate section 12 of the injecting apparatus by the tubular structure, hereintofore referred to as the upper section 11 of the injecting apparatus, which is preferably formed integral with the transmission housing. The spindle is rotatably supported by spaced rolling contact bearing units 58 and 59, mounted in the housing 57 and the cover plate 60 of the latter, respectively. A thrust bearing unit 61 disposed between the cover plate and a spacer 62 which bears upon one side of the worm gear 56, opposes axial movement of the latter in one direction, and a thrust bearing unit 63 disposed between the bearing unit 58 and the other side of the gear opposes axial movement of the worm gear in the opposite direction.

The motor 53 is of a reversible driving type and is provided with a switch mechanism not shown, by which the motor may be controlled in order to operate it in either a forward or in a reverse direction. Reversing of the motor may be done automatically with a control apparatus disclosed in my above-mentioned application, Serial No. 521,197.

The material to be injected may be heated while it is in the injecting apparatus in any suitable manner. A heating element 65 may be provided in the wall structure of the heating chamber 13 and the end of this chamber, as well as the nozzle, may be heated by a heating element 66 fixed to the lower end of the chamber 13 and the surrounding nozzle. A gap 67 may be provided between the main portion of the adjacent ends of the intermediate section 12 and the heating chamber 13 in order to reduce the transmission of heat from the latter to the material in the vicinity in which it is being initially placed under compression.

In operation, the material to be injected is fed through an inlet opening (not shown) in the wall of the upper section 11 into the interior of the latter and through the inlet end 43 of the intermediate section into the passage 16. Such material may be supplied through said inlet in comminuted, powdered, granular or other suitable form or by feeding mechanism (not shown) such as that illustrated in my copending application, Serial No. 521,197.

As the screw 20 is driven in a forward direction, material introduced through the inlet opening is conveyed by it downwardly through the passage 16 of the intermediate section 12. During initial forward rotation of the screw 20, the spring 53 holds the valve element 48 on its seat 49, thereby initially obstructing flow of the material to the nozzle passage 18. As the pressure to which the material is subjected is increased, it urges the screw 20 axially upwardly against the action of the spring 53 and moves the valve element 48 to its open position. This automatic valve action assures that the material will not be discharged from the apparatus until it is subjected to a predetermined pressure.

The gears 30 and 31, which mesh with the thread of the screw 20, serve, during forward rotation of the screw, to prevent the material between the turns of the thread from rotating with the screw, thereby assuring a positive creation of pressure upon the material.

Reverse driving of the motor 53 may be continued only momentarily, preferably only sufficiently to rotate the screw 20 reversely through a fraction of one rotation. This reverse action may be continued through several rotations, or until rotation of the screw 20 is sufficient to relieve the pressure within the passage 16 of the intermediate section 12 and the passage 17 of the heating chamber 13 to an extent sufficient to permit the spring 53 to urge the screw 20 axially downwardly, thereby seating the valve element 48 upon the valve seat 49. The relief of the pressure which is brought about by reverse rotation of the screw 20, immediately upon the cessation of the forward rotation of the screw, prevents the material which has been placed under compression from flowing through the chambers 26 and 27 in which the gears 30 and 31 are disposed and becoming so compacted therein as to prevent subsequent operation of the apparatus by interposing an excessively high starting through resistance.

The valve action performed by the valve element 48 and seat 49 not only obstructs the unintended escapement of material from the apparatus, but it also prevents the back flow of material under pressure of the material.

The lubricating mechanism comprises a casing 70, mounted on the upper section 11, which not only contains the pumping mechanism but also serves as a reservoir for lubricant. Mounted on the inner lower extremity of the casing 70 is a cylinder member 71 which shiftably receives a piston member 72. A cylinder outlet aperture 73 extends through the lower end wall of the casing 70, is aligned with the interior of the cylinder member 71 and provides an outlet passage therefrom. A bellcrank element 74 is pivotally mounted on a bracket 75 secured to the inner side of the casing 70 and is provided with lower and upper arms 76 and 78, respectively. The lower arm 76 engages a contact element 77, projecting outwardly from the end of the piston member 72, The bellcrank 74 is oscillated in timed relation with rotation of the screw 20 by a cam follower 79 which is shiftably mounted in registering apertures 80 and 81 formed in the wall of the upper section 11 and in the wall of the pump casing 70, respectively. This cam follower is engaged with a cam member 82 fixed to the spindle 46. The cam follower 79 comprises telescoping inner and outer portions 83 and 84 respectively which are yieldably urged apart by a spring 85 bearing therebetween.

Piston member 72 is urged outwardly of the cylinder 71 against the arm 76 of the bellcrank element 74 by a spring 84 disposed within the cylinder member 71. One extremity of the spring 84 bears against the piston 72 and the other extremity bears against the lower end of the casing 70.

The lubricant is introduced into the casing 70 through a filling spout 86 which is provided with a removable cap 87. The lubricant flows from the interior of the casing 70 into the interior of the cylinder member 71 through a cylinder inlet passage 88 formed in a check valve member 89 which is threaded in an aperture in the wall of the cylinder member 71. The check valve member 89 has a valve seat 189 for receiving a ball valve element 90 which is disposed in an enlarged end portion of the passage 88. The check member 89 is removably mounted through an aperture 91 of casing 70, the inner extremity being threaded in the wall of cylinder member 71 so that the inlet passage 88 will be in position to deliver the lubricant to the cylinder member. Leakage of lubricants through aperture 91 is prevented by washer element 90.

The cylinder outlet aperture 73 is connected to the chambers 24 and 25 in which the gears 30 and 31 respectively are disposed by a conduit 93 having a branch 193 leading to the chamber 26 and a branch 194 leading to the chamber 25. The branch conduits 193 and 194 are provided with valves 195 and 196 respectively by which the flow of lubricant may be regulated or shut off.

In order to regulate the amount of lubricant discharged from the pump mechanism to the various portions of the apparatus, a threaded member 96 is mounted in the threaded aperture 97 of the casing 70 and is rotatably adjustable therein. An abutment 98 of the threaded member 96 contacts the arm 78 of the bellcrank 74 limiting the clockwise rotation of the bellcrank 74 and thereby limiting the stroke of the piston member 72. Since the amount of lubricant discharged from the pumping mechanism is directly dependent upon the stroke of the piston, a limitation on the latter will mean a limitation on the former. To allow for any further rightwardly motion of the cam follower, as viewed in Fig. 1, by the cam 82 when the arm 78 of the bellcrank 74 is in its furtherest clockwise position, the spring 85 of the cam follower 79 accommodates a telescoping action of the cam follower. This position of the cam member 82, cam follower 79 and arm 78 of bellcrank 74 is illustrated in the right-hand lubricating mechanism of Fig. 1. As the bellcrank member 74 moves toward this position, arm 76 of the bellcrank member 74 actuates piston 72 downwardly, thereby discharging lubricant through tube members 93 and 94 into the lubricant discharge points of the injection molding apparatus.

Although two pumping mechanisms are shown in Fig. 1, the description of one will suffice for both. The only difference between the mechanisms as shown is their respective points of discharge in the injection apparatus. Lubricant is delivered from the pump mechanism at the left of the injection apparatus in Fig. 1 by conduit 94 having a branch 197 leading to the bore 17 at a point 95 substantially between dams 30 and 31, and a branch 198 leading to aperture 18 of nozzle body 15. The branch conduits 197 and 198 are provided with valves 199 and 200 respectively by which the flow of lubricant may be regulated or shut off.

The connecting mechanism of conduit 198 to the aperture 18 of the nozzle body 15 is more clearly shown in Fig. 2. A valve body 201 has one extremity threaded into a passage in the nozzle body 15 communicating with the discharge passage 18 and has its other extremity threaded into a coupling member 206 which couples the valve body 201 to the conduit branch 198. A passage 202 having an enlarged end portion 204 is disposed within the valve body 201. The enlarged portion comprises a valve seat 203 for receiving a ball member 205 which acts as a one way valve mechanism for lubricant passing through the passage 202 into the aperture 18. The valve seat 203 should be placed as close as possible to the aperture 18 to facilitate a minimum amount of molding material hardening within the enlarged portion 204 when the operation of the injection apparatus ceases. The main purpose of placing a discharge point for lubricants in the nozzle is to apply lubricant on the surface of the material immediately before it is introduced into the mold. The lubricant substantially surrounds the material as it passes through the nozzle and therefore facilitates the flow of the material into and through the passages of the mold.

A heating element 99 comprising a resistance coil or other suitable heating means may be disposed within the casing 70 to keep the lubricant at a sufficient temperature so that it will always be in a readily flowable liquid stage.

By employing the lubricating mechanism as described herein the molding material is more readily delivered through the bore of the injection apparatus thereby requiring less pressure for this operation. If desired a plurality of pumps may be used for delivering different amounts and different kinds of lubricant to the various discharge points of the injection apparatus. Since the surface of the molding material is lubricated at its discharge point, the interstices of the mold are readily filled, thereby making the molded part of a more uniform density. The type of lubricant used in this lubricating mechanism should be selected with regard to the type of material fed into the injection molding apparatus. Several points should be considered when the type of lubricant is chosen:

1. The lubricant should lubricate the passage of material fed to the injection molding apparatus.

2. The lubricant should prevent said material from adhering to the apparatus.

3. The lubricant should be compatible with the material.

4. The lubricant should not prevent cohesion of the particles of the material.

To more clearly illustrate the types of lubricants to be used with the different types of materials which are fed into the injection molding apparatus, I will give the following typical examples:

1. A solution or dispersion of fatty acid type wetting agents, such as coal tar oil plasticisers, may be used as a lubricant for natural or synthetic rubber.

2. Heated carnauba wax may be used for thermosetting resins.

3. Lubricant used with thermoplastic resins may be the same type as used for natural or synthetic ruber.

Various changes may be made in the specific embodiment of my invention without departing from the spirit thereof, or from the scope of the appended claims.

I claim:

1. In an injection molding apparatus, the combination comprising a movable element for feeding moldable material, a pump mechanism for intermittently supplying liquid lubricant to said material and said movable element, a cam associated with said movable element, and pump driving mechanism actuated by said cam for operating said pump mechanism.

2. In an injecting apparatus for feeding moldable material to a forming device, the combination comprising a rotatable element for propelling said moldable material under pressure, a pump mechanism for intermittently supplying lubricant to said material and said rotatable element, a cam rotatable with said element, and a mechanism actuated by said cam for operating said pump mechanism.

3. In an injection molding apparatus, the combination comprising a rotatable element for feeding moldable material, a pump mechanism including a piston member for intermittently supplying liquid lubricant to said material and said element, a cam rotatable with said element, and a pump driving mechanism operable by said cam for operating said piston member, said mechanism including the cam follower actuated by said cam and a bellcrank connecting said cam follower with said piston member.

4. In an injection molding apparatus, the combination comprising a rotatable element for feeding moldable material, a pump mechanism including a piston member for intermittently supplying liquid lubricant to said material and said element, a cam rotatable with said element, pump driving mechanism operable by said cam for operating said piston member, said mechanism including a cam follower actuated by said cam and a bellcrank connecting said cam follower with said piston member, and adjustable means for limiting the stroke of said piston.

5. In an injection molding apparatus comprising a housing having a bore, a rotatable element in said bore, a cam in said housing rotatable with said element, pressure lubricating mechanism adjacent a wall of said housing, and a cam follower extending through said wall of said housing into said bore for operation by said cam and having one extremity engaging said cam, the other extremity of said cam follower being operatively engaged with said pressure lubricating mechanism.

6. An injection molding apparatus comprising a housing containing a bore, a rotatable element in said bore, a cam in said housing rotatable with said element, a casing mounted on said housing having a reservoir for lubricant, a lubricant displacing unit in said casing, a bellcrank element mounted on said casing having one arm engageable with said unit, and a cam follower extending through adjacent wall portions of said casing and said housing having one extremity operatively associated with the other arm of said bellcrank element, having its other extremity in engagement with said cam.

7. An injection molding apparatus comprising a housing containing a bore, a rotatable element in said bore, a cam in said housing rotatable with said element, a casing mounted on said housing having a reservoir for lubricant, a lubricating displacing unit in said casing, a bellcrank element mounted on said casing having one arm engageable with said unit, a cam follower extending through adjacent wall portions of said casing and said housing having one extremity operatively associated with the other arm of said bellcrank element, having its other extremity in engagement with said cam, and a heating element in said reservoir for maintaining said lubricant in a readily flowable liquid state.

8. An injecting apparatus comprising a housing containing a bore, a rotatable element in said bore, a cam in said housing rotatable with said element, a casing having a reservoir for lubricant, a lubricant delivering displacing unit, a bellcrank element mounted on said casing having one arm engageable with said unit, an adjustable member threaded in the wall of said casing for limiting rotation of said bellcrank, and a cam follower extending through adjacent wall portions of said casing and said housing having one extremity operatively associated with the other arm of said bellcrank element, having its other extremity in engagement with said cam.

9. An injecting apparatus for feeding moldable material to a forming device comprising a housing having a bore and a chamber adjacent said bore, a rotatable screw element in said bore for propelling said material, a rotatable gear member disposed within said chamber having teeth meshed with screw element, a discharge nozzle at the outlet of said bore having a passage to accommodate the flow of said material to said forming device, and lubricating means having a first outlet communicating with said chamber for supplying lubricant to the interior of said chamber and a second outlet discharge nozzle for introducing lubricant into said nozzle passage.

10. An injecting apparatus for feeding moldable material to a forming device, comprising a housing having a bore and a chamber adjacent said bore, a rotatable screw element in said bore for propelling said material, a rotatable gear member positioned within said chamber having teeth meshed with said screw element, and a lubricating mechanism having an outlet communicating with said chamber for supplying lubricant to the interior of said chamber for lubricating the movement of said material in said chamber and through said bore.

WALTER P. COUSINO.

REFERENCES CITED

The following references are of record in the file of this patent:

UNITED STATES PATENTS

| Number | Name | Date |
|---|---|---|
| 2,307,055 | Menger et al. | Jan. 5, 1943 |
| 2,365,326 | Bailey | Dec. 19, 1944 |
| 2,393,452 | Bailey et al. | Jan. 22, 1946 |